United States Patent Office 2,712,024
Patented June 28, 1955

2,712,024

ADRENOCHROME DERIVATIVE AND PROCESS

Desider Fleischhacker, New York, and Norman Barsel, Laurelton, N. Y., assignors to International Hormones, Inc., Brooklyn, N. Y., a corporation of New York No Drawing. Application May 19, 1953,
Serial No. 356,109

1 Claim. (Cl. 260—319)

The present invention relates to a novel adrenochrome derivative.

More particularly the present invention relates to the novel compound adrenochrome mono-thiosemicarbazone and to a process for the production thereof.

In the United States Patent No. 2,506,294 of May 2, 1950, there is disclosed certain adrenochrome derivatives such as the mono-oxime, semicarbazone etc. In accordance with the patent, these adrenochrome derivatives are produced by reacting salts of hydroxylamine or semicarbazide with adrenochrome. The resultant products are stated to be stable derivatives of adrenochrome having valuable haemostatic properties.

In accordance with the present invention, it has been discovered that still another adrenochrome derivative having valuable haemostatic properties may be prepared by the reaction of thiosemicarbazide with adrenochrome. The resultant compound, the mono-thiosemicarbazone of adrenochrome is a valuable haemostat and especially when used, in the form of a complex or other combination, with non-toxic water soluble salts such as the sodium salt of 3-hydroxy-2-naphthoic acid as more fully described in our copending application Serial No. 356,108, filed as of even date herewith.

In accordance with the present invention it has been discovered that the thiosemicarbazone of adrenochrome may be preferably prepared by reacting thiosemicarbazide itself rather than any derivative thereof with the adrenochrome in aqueous alcoholic solution.

The following reaction serves to illustrate the process of the present invention.

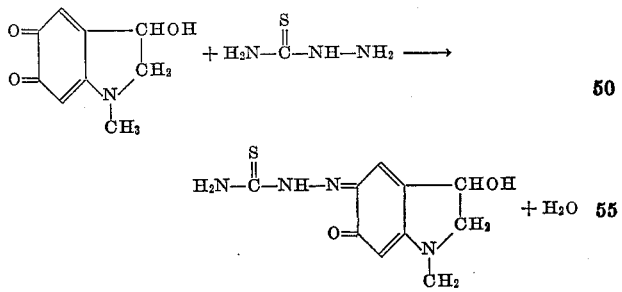

In proceeding in accordance with the above equation, a suitable quantity of adrenochrome is dissolved in distilled water so as to form a clear solution, approximately 20 cc. of distilled water being utilized for each gram of adrenochrome. The solution is then filtered and to the solution is added an equal quantity of a suitable lower aliphatic alcohol such as ethyl alcohol. Thereafter a solution of thiosemicarbazide dissolved in 50% alcohol is added thereto. The reaction solution is then allowed to stand at room temperature over night or it can be heated for a short time as, for example, one hour under reflux at 100° C. The resultant precipitate of impure thiosemicarbazone of adrenochrome is then purified as by dissolving the same in a suitable hot solvent such as pyridine. The pyridine solution is then filtered and the purified thiosemicarbazone precipitated by adding the pyridine solution to cold water.

The following specific examples serve to illustrate but are not intended to limit the present invention:

Example I 18. g. of adrenochrome prepared by the oxidation of adrenalin with silver oxide is dissolved in 300 cc. of distilled water and the resultant solution filtered. Thereafter there is added to this solution 300 cc. of ethyl alcohol. To the alcohol-water solution of adrenochrome is added 18 g. of thiosemicarbazide dissolved in 700 cc. of 50% ethyl alcohol. The two solutions are thoroughly mixed and the reaction mixture is then allowed to stand at room temperature over night. The resultant precipitate consisting largely of impure thiosemicarbazone of adrenochrome upon filtration from the solution weighed approximately 14 g. The precipitate was purified by dissolving the same in boiling pyridine—1250 cc. of pyridine being utilized. The resultant solution was filtered and was thereafter added with stirring to 8 liters of cold water. The resulting compound was the thiosemicarbazone of adrenochrome having a melting point of 215° C. to 220° C., with decomposition and the following formula:

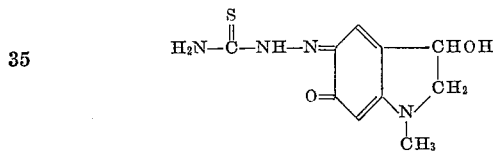

Example II

The procedure of Example I was followed precisely except that instead of allowing the reaction mixture to stand at room temperature over night the reaction mixture was refluxed for approximately one hour. The same product in approximately the same yield was produced and was similarly purified.

We claim:

The thiosemicarbazone of adrenochrome having the following formula:

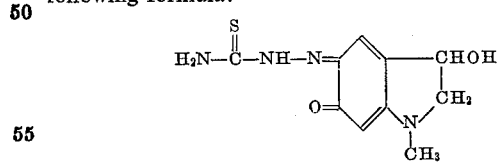

References Cited in the file of this patent

UNITED STATES PATENTS 2,506,294    Dechamps _____ May 2, 1950

OTHER REFERENCES

Kirk-Othmer, Encyclopedia of Chem. Technology, vol. 7, pp. 586–7 (1951).

Thorpe, Dictionary of Applied Chem., vol. III, p. 537 (1922).